Nov. 28, 1961   J. T. WOOD   3,010,528
TEST-WEIGHING
Filed Aug. 12, 1958   4 Sheets-Sheet 4

Inventor
JOHN THOMAS WOOD
By
Mead Browne Schuyler & Beveridge
Attorneys the United States Patent Office 3,010,528
Patented Nov. 28, 1961

3,010,528
TEST-WEIGHING
John Thomas Wood, 54 Hampton Road,
Southport, England
Filed Aug. 12, 1958, Ser. No. 754,668
1 Claim. (Cl. 177—50)

The present invention relates to the test-weighing of of selected specimens of a continuous delivery of articles or measured cohering quantities of matter and correcting the weights of the articles or quantities succeeding a tested specimen in dependence on the weight test responses in a manner tending to stabilise the weights of the individual articles or quantities at a predetermined value.

According to the present invention the apparatus includes a weigh beam, and two quick acting relays adapted to be energised respectively by an underweight or overweight deflection of said beam, and each being further adapted, when energised, to render the other said relay inoperative besides initiating a weight correcting adjustment of the delivery.

According to a further feature of the invention the weight correcting relationship of the weighing mechanism with the delivery is interrupted soon thereafter until such time as the cycle is repeated with a fresh specimen. A master switch controlling the electric input is preferably closed and opened in a timed relationship with the selection of a specimen to be tested ensuring that the weighing mechanism is not sensitive until the weight beam is in an appropriately settled state under the load of the specimen and that the weighing mechanism is rendered insensitive as soon as is practicable after the test has been accomplished.

The periods in which the weighing mechanism is sensitive, that is to say, correctively functional, both as a whole and as to its ability to apply a particular correction, may thus be accurately limited, so that only small deflections, particularly of a damped weigh beam, may be utilised and the test weighing effected with commensurate rapidity. More rapid test weighing enables the weighing of a greater number of selected specimens per unit time and results in greater stability of the individual weights of the articles or measured coherent quantities of material.

In describing the invention further, reference will be made to the accompanying drawings, in which.

Figure 1:
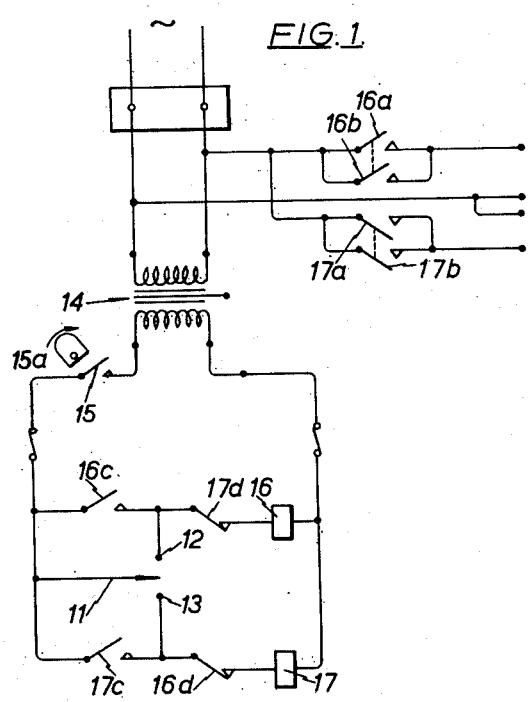
FIG. 1 is a diagram of an electrical circuit suitable for controlling the periods in which the weighing mechanism is sensitive.

Referring to FIG. 1, a weigh beam or appendage thereof denoted 11 is disposed for deflection to "make" with contacts 12 and 13. The weigh beam and these contacts are connected to an alternating high voltage supply through a step-down transformer 14 and a master switch 15. In series with the contacts 12 and 13 are the operating coils of relays 16 and 17, respectively. Each of these relays possesses four contact pairs 16a . . . 16d, 17a . . . 17d. The contacts 16a and 16b are connected in parallel and normally open in a circuit connecting the high voltage input to means effecting or controlling delivery correction, and the contacts 17a, 17b are disposed likewise in a circuit for opposite correction. The contacts 16c are normally open and constitute holding-in contacts which, when closed, maintain the supply to the operating coil of the relay 16 even though the weigh beam or its appendage 11 may be clear of the contact 12. The contacts 17c are disposed and act similarly in relation to the relay 17. The contacts 16d are normally closed and are located in the operating circuit of the other relay 17 and thus act to prevent energisation of the relay 17 when the relay 16 has operated, the contacts 17d being also normally closed, and in this case being similarly disposed in the operating circuit of the relay 16.

When the master switch 15 is closed and an article or measured quantity loading the weigh beam causes, say, making of the contact 12, the relay 16 is energised and maintained in this condition by closing of the holding-in contacts 16c (until such time as the master switch is opened), the paralleled contacts 16a, 16b are closed to effect a corrective adjustment of the delivery, and the contacts 16d are opened to avoid energisation of the relay 17 due to rebound of the weigh beam on to the contact 13. The sequence of operations following making of the contact 13 is similar to achieve an opposite corrective adjustment. The master switch 15 is preferably opened and closed in timed relation with the selection of an article or measured quantity selected to load the weigh beam, as by means of a cam 15a driven from the delivering machine.

The alternating high voltage supply is stepped down by means of the transformer 14 from say 230 to 25 volts. This is important because 25 volts is a safety voltage and eliminates the necessity of protective guards on the scales, which become "live" when the master switch operates, also the low voltage at the scale contacts makes it possible to have a very small gap between the contacts without the current jumping the gap. If a high voltage were used it would be necessary to have a wider gap at the contacts and damping of the beam would be impaired. It is also important to use contacts which have a low resistance so that only a slight mechanical pressure will permit the low voltage current to pass. Silver is a suitable material for the contacts in question.

Various systems for the translation of weight responses of the weighing mechanism into corrective adjustments of the delivery are known, and generally the accomplishment thereof is resolved into a form of remote control modified to the character of the machine which produces the articles or measures out the quantities, as the case may be. Solenoids may be employed for the purpose, one being adapted to initiate a weight increasing corrective step in response to underweight variation detected by the weighing mechanism and another to initiate a reducing corrective step in response to overweight variation. The action of the solenoids may be direct or indirect.

Quoting an example of a directly acting solenoid arrangement, two pinions, each of which is fixedly secured to a casing enclosing a ratchet, are each adapted to be rotated by a rack and are mounted to be freely rotatable on a common shaft. Within each casing is pivotally supported a pawl, the two pawls being arranged on opposite sides of the shaft, so as each to engage one of the ratchets, which latter are keyed to the shaft. The two solenoids are situated on either side of and below the shaft and are each in driving relationship with one of the racks which rotate the pinions. When one of these solenoids operates pulling its associated rack downwards, the pinion meshing with said rack is rotated causing the associated ratchet casing to turn. The pawl within the ratchet casing is thus brought into engagement with the ratchet, causing the latter to rotate and hence to turn the shaft. On being de-energised the solenoid and rack are pulled back into their normal rest position by means of a spring, the pawl rides freely over the ratchet teeth, means being provided to ultimately disengage the pawl from the ratchet, and the shaft is then left free to be rotated again should the necessity arise. Thus each solenoid can operate independently. Should the other solenoid operate, the shaft is caused to rotate in the opposite direction. The solenoids therefore supply the motive force to rotate the shaft which in turn resets the delivering machine.

This illustrated embodiment shows the application of directly acting solenoids, but it may be preferable, especially when intended to control a dough divider, to employ solenoids acting indirectly, because indirect solenoid action gives a smoother and more sensitive movement.

The solenoids act indirectly when, for instance, they are arranged to actuate valves controlling the admission of a pressure medium to cylinders of which the pistons supply the motive force to the aforementioned racks. Where weight adjustment of the delivering machine entails the moving of two stops simultaneously, as is necessary for instance to alter the travel of a reciprocating plunger of a gob feeding machine used in the manufacture of glassware, one stop may be moved by the shaft already referred to whilst to move the other, a second shaft may be provided either geared directly to the other shaft or driven by the racks through a separate duplicate ratchet system.

Figure 2:
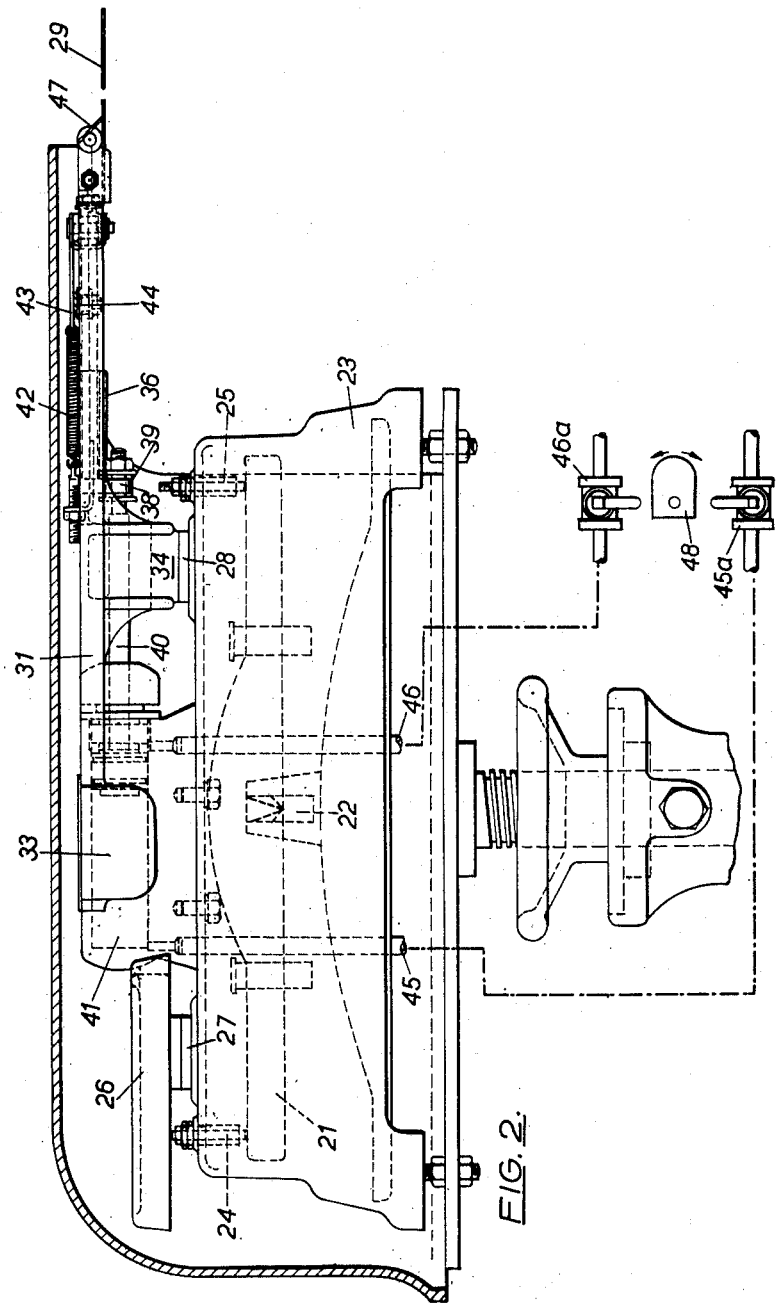
FIG. 2 is a part sectional elevation of a test weighing unit in which obscured parts of the weighing mechanism indicated by broken lines represent the mechanism in diagrammatic form only.
Figure 3:
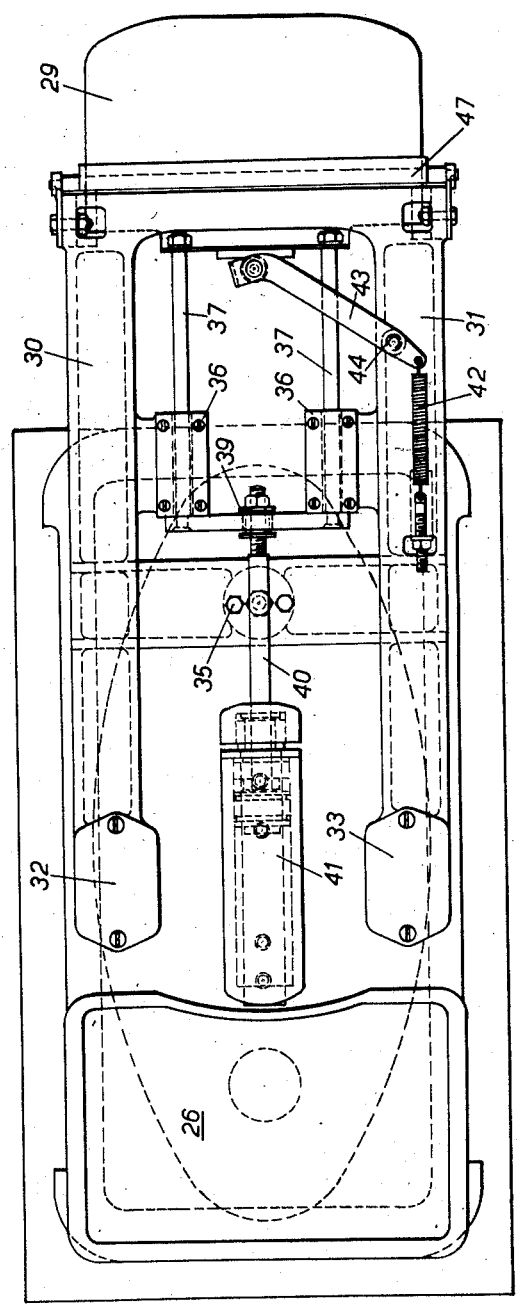
FIG. 3 is a plan view of FIG. 2.

Referring now to FIGS. 2 and 3, a weigh beam is diagrammatically illustrated at 21 supported on a fulcrum 22. The beam is electrically conductive and is connected in the electrical circuit of FIG. 1 to correspond with the element 11. A cover 23 encloses the beam and insulatedly mounted in the cover respectively adjacent the ends of the beam are contact screws 24, 25 corresponding to the contacts 12, 13 of FIG. 1. The weight pan 26 of the scales acts on the beam through a pillar 27 whilst the goods pan is supported by and acts on the beam through a pillar 28. The beam is effectively damped, by the provision of relatively small clearances between it and the contact screws 24, 25; for instance in the undeflected condition of the beam the clearances pertaining between itself and the contact screws 24, 25 may be as little as 0.003 inch. Furthermore, a dashpot may be provided for additional damping. As will be evident, contact of the beam with the screw 24 is made by an overweight deflection, and with the screw 25 by an underweight deflection. Due to the very small deflections required of the weight beam, it is posible to carry out rapid test-weighing of a large number of specimens per unit time.

The embodiment illustrated in FIGS. 2 and 3 is chosen particularly for the way I have devised of handling sticky plastic material, such as dough, for test-weighing purposes. The goods pan is in the form of a sliding plate 29 mounted for sliding movement in relation to a supporting structure comprising two parallel spaced arms 30, 31 carrying counterweights 32, 33, respectively and joined by a transverse bridge 34 secured by bolts 35 to the pillar 28. Guide blocks 36 are cast integrally with the supporting structure, and passing through these guide blocks are slide rods 37 connected at one end to an upturned edge of the sliding goods pan 29 and at the other end to a cross-beam 38. The cross-beam 38 has a slot in which there is located loosely a bobbin 39 which is secured to one end of the piston rod 40 of a piston and cylinder assembly 41 fixed on the cover 23. The sliding goods pan 29 is biassed towards the fully forward position by a spring 42 acting thereon through a lever 43 pivoted at 44 on the supporting structure intermediate the point of engagement of the lever 43 with the sliding goods pan and the point of attachment of the spring thereon. In the fully forward position of the sliding goods pan, the limited degree of up and down movement of the supporting structure and goods pan requisite to operation of the weighing mechanism is permitted by the bobbin and slot connection.

Pressure fluid is admitted to one side or the other of the piston in the piston and cylinder assembly 41 through pipes 45, 46. The admission through these pipes is controlled in dependence on the rate of working of the delivering machine so that the sliding goods pan 29 is in a forward position to intercept or catch those of a stream of falling masses of plastic material which are to be selected for test-weighing and after weighing has been effected is withdrawn rearwardly. On withdrawal of the pan, a scraper blade 47 becomes active to remove the material mass which tends to adhere thereto. A cam 48 rotated by the delivering machine may be used to actuate a valve or valves 45a and 46a controlling pressure fluid admission to the piston and cylinder assembly 41, and this cam 48 may be combined with the cam 15a adapted to close the master switch 15 (FIG. 1) at the instant when the test-weighing unit is to become correctively functional in relation to the delivering machine and subsequently to open same.

The test-weighing unit as illustrated may be employed in conjunction with a dough divider as used in the baking of bread. Where, as is generally the case with a dough divider, the articles or measured quantities are delivered in batches, one only of each batch may be intercepted, but particularly with an intermittent delivery of single articles or quantities, the selection for testing may extend to every such article or quantity.

It is preferred that the corrective adjustments are in addition applied cumulatively to an element movable between limit switches, for example a reducing correction might move the element forward by one step and an increasing correction move the element backward by one step. When actuated, the limit switches may be utilised to operate either acoustic or visual warning signals, and alternatively or in addition, the limit switch, which corresponds to persistent underweight of the article or quantities may when actuated initiate a subsidiary feed adding to the weight of the articles or measured quantities and/or be arranged to cut out the delivery adjusting mechanism altogether, i.e. to limit the amount of adjustment which may have to be counteracted on resumption of normal delivery.

Figure 4:
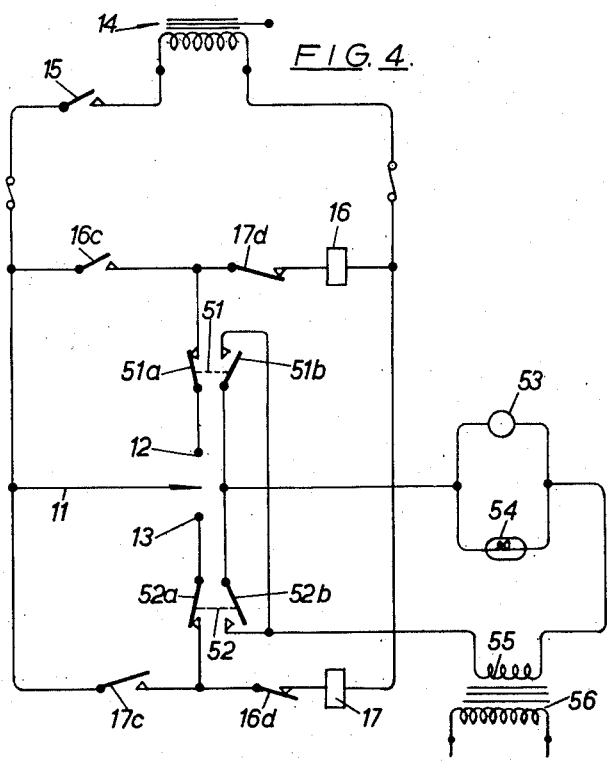
FIG. 4 is a diagram generally similar to FIG. 1 but including circuits responsive to limit switches for giving acoustic and visual indications and for cutting out the delivery adjusting mechanism altogether responsive to a plurality of cumulative adjustments having been applied.

Referring to FIG. 4 there are two limit switches having operating members 51 and 52 respectively adapted to be displaced to the left in this figure in the event of a predetermined cumulative number of overweight or underweight corrections having been effected as the case may be. The members 51 and 52 may, for example, be mounted on threaded carriers such as screwed rods, along which they are moved through a predetermined distance on each operation of the delivery adjusting mechanism. The operating member 51 on limit-attainment displacement causes cumulative overweight correction normally closed contacts 51a to open and associated normally open contacts 51b to close; whilst similarly on limit-attainment displacement the operating member 52 causes normally closed cumulative underweight correction contacts 52a to open and associated contacts 52b to close.

Thus on limit-attainment displacement of the operating member 51 the correction control circuit via the contact 12 (as in FIG. 1) is broken by the opening of contacts 51a thereby preventing further actuation of the control mechanism, whilst at the same time the contacts 51b on closing energise an acoustic alarm in the form of a bell 53 and a visual indicator in the form of a lamp 54 by completion of a circuit to a low voltage winding 55 of a transformer 56. Similar action obtains in the event of limit-attainment displacement of the operating member 52 responsive to cumulative underweight correction having been applied.

Used in conjunction with articles less resistive to sliding, such as glassware, the goods pan may be of usual construction and the selected specimens be diverted from the stream for weighing thereon. By way of example, there is fitted alongside the goods pan a plate known as the dead plate on which is arranged a swivel cylinder and a fixed cylinder. The swivel cylinder is coupled by means of a piston rod to a finger plate having four curved fingers equally spaced lying in the horizontal plane. When air is passed to the front end of the swivel cylinder the finger plate is rotated one quarter of the circle (90°). When air is passed to the rear of this cylinder the piston rod travels forwards and the finger plate remains stationary by means of ratchets mounted above and below this plate. The unit is placed in position alongside a conveyor belt carrying the glassware, for instance, in such a position that when the finger plate rotates a piece of ware is transferred from the conveyor on to the dead plate. The fixed cylinder is situated so that when air is passed to the rear of it a pusher bar coupled to the cylinder by means of a piston rod is moved forward pushing the piece off the dead plate on to the scale pan. After being weighed the glassware is automatically replaced on to the conveyor belt by means of another compressed air cylinder and pusher bar mounted on the opposite side of the scales to the dead plate. This process is so timed in relation to the speed of the conveyor belt that the ware will return to the original position on the conveyor belt.

A continuous record of the setting of the handwheel or other control element of the delivering machine may be made by displacement of a stylus responsive to such setting across a continuously moving sheet or strip. Such a record then shows the number of corrective resettings made, as well as long term and short term tendencies as regards delivery of articles or quantities. The stylus movement may be derived by direct mechanical connection thereof with the control or by indirect mechanical means, or electrical, electromagnetic, pneumatic or hydraulic displacement reproducing arrangements which may amplify, reduce or otherwise modify the original displacement as reproduced by movement of the stylus.

A dog clutch or spring loaded driving pin or other disengageable connection is preferably provided for resetting the relationship between the control mechanism, for instance the handwheel on a dough divider, and the weight correcting mechanism adapted to actuate such control mechanism. Such resetting is necessary if the control mechanism is required for delivery of a larger size of article or quantity of matter after having been used for a smaller size or vice versa. To ensure proper action the mean or normal position of the control mechanism for a given size of delivery is selected with the connection disengaged, examination of the limit contacts, or of the recorder if fitted, then enables the correcting mechanism to be set to a corresponding mean or normal position, and then the connection is re-engaged.

I claim:

A test-weighing apparatus for test-weighing selected specimens of a continuous delivery of articles and having a similar nominal weight and selectively operating control circuit closure means responsive to departures of the weights of said articles from said nominal weight, said apparatus comprising a weigh beam, a supporting structure pivotally carrying said weigh beam, a pan slidingly arranged on said weigh beam, said pan being resiliently biased into a forward end position with respect to said weigh beam for intercepting a specimen article to be weighed from said continuous delivery, a fluid pressure operated piston and cylinder assembly carried by said supporting structure, means loosely connecting the piston of said assembly with said sliding pan for retracting said pan along said weigh beam, fluid pressure control valves operable in timed relation to the selection of said specimen for controlling the admission of pressure fluid to opposite ends of the cylinder of said assembly, means carried by said supporting structure adjacent said sliding pan for dislodging said specimen from said pan when said pan is retracted along said weigh beam, a plurality of electrical contacts on said weigh beam, a plurality of electrical contacts on said supporting structure co-operating and in closely spaced relation one with each of the contacts on the weigh beam, said co-operating pairs of contacts constituting switch means selectively closeable responsive to small overweight and underweight deflections of said weigh beam, an electrical power supply line, a pair of quick-acting electrical relays respectively connected across said power supply line by way of said switch means, an electrical master switch in said power supply line, means for opening and closing said master switch in timed relation with the selection of said specimen to be test-weighed and delaying the operation of said master switch while said weigh beam becomes stabilized after receiving said specimen on said sliding pan, a first normally open electrical contact pair on each relay and constituting said circuit closure means, and a second normally closed contact pair on each relay arranged in the connection of the other said relay to said power supply line, whereby energisation of said other relay is prevented when said first mentioned relay is operated.

References Cited in the file of this patent
UNITED STATES PATENTS

| | | |
|---|---|---|
| 1,089,680 | Sloan | Mar. 10, 1914 |
| 1,738,634 | Bryant | Dec. 10, 1929 |
| 2,076,617 | Cleaves | Apr. 13, 1937 |
| 2,306,789 | McNamara | Dec. 29, 1942 |
| 2,324,667 | Baker | July 20, 1943 |
| 2,538,346 | Wood | Jan. 16, 1951 |
| 2,628,055 | Knobel | Feb. 10, 1953 |
| 2,664,557 | Sargrove | Dec. 29, 1953 |
| 2,688,459 | Merrill | Sept. 7, 1954 |
| 2,693,336 | Johnson | Nov. 2, 1954 |